US009669538B2

(12) United States Patent
Iannelli

(10) Patent No.: US 9,669,538 B2
(45) Date of Patent: Jun. 6, 2017

(54) MULTI FUNCTION TOOL TABLE

(71) Applicant: Joseph Iannelli, Boynton Beach, FL (US)

(72) Inventor: Joseph Iannelli, Boynton Beach, FL (US)

( * ) Notice: Subject to any disclaimer, the term of this patent is extended or adjusted under 35 U.S.C. 154(b) by 0 days.

(21) Appl. No.: 15/257,405

(22) Filed: Sep. 6, 2016

(65) Prior Publication Data

US 2017/0066122 A1 Mar. 9, 2017

Related U.S. Application Data

(60) Provisional application No. 62/213,722, filed on Sep. 3, 2015.

(51) Int. Cl.

| | |
|---|---|
| ***B23P 19/00*** | (2006.01) |
| ***B25H 1/00*** | (2006.01) |
| ***B25H 1/12*** | (2006.01) |
| ***B23Q 9/00*** | (2006.01) |

(52) U.S. Cl.

CPC ......... *B25H 1/0042* (2013.01); *B23Q 9/0078* (2013.01); *B25H 1/0078* (2013.01); *B25H 1/12* (2013.01)

(58) Field of Classification Search

CPC ........ B23P 19/006; B23P 19/04; G05B 19/00; B23Q 1/03; B23Q 1/28; B23Q 1/25; B23Q 1/74; B23Q 5/00

See application file for complete search history.

(56) References Cited

U.S. PATENT DOCUMENTS

| | | | | |
|---|---|---|---|---|
| 1,940,178 | A | 12/1933 | Mohr | |
| 3,151,642 | A | 10/1964 | Olson | |
| 3,727,502 | A | 4/1973 | Steinman | |
| 3,866,496 | A | 2/1975 | Payne et al. | |
| 4,281,694 | A | 8/1981 | Gorman | |
| 4,617,720 | A * | 10/1986 | Palfery | B23Q 1/522 409/221 |
| 4,920,845 | A | 5/1990 | Blanchette | |
| 4,995,288 | A | 2/1991 | DellaPolla | |
| 5,080,152 | A | 1/1992 | Collins et al. | |
| 5,906,539 | A * | 5/1999 | Tabel | B25H 1/02 248/188.2 |
| 6,206,063 | B1 | 3/2001 | Lin | |
| 6,431,042 | B1 | 8/2002 | Brault et al. | |
| 6,431,535 | B1 * | 8/2002 | Volpe | B25H 1/0007 269/47 |
| 7,044,039 | B2 | 5/2006 | Powell | |
| 9,327,374 | B1 * | 5/2016 | McCulloch | B23Q 3/062 |
| 2008/0047120 | A1 * | 2/2008 | Soroka | B23Q 1/01 29/27 C |

(Continued)

*Primary Examiner* — Lee D Wilson

(74) *Attorney, Agent, or Firm* — St. Onge Steward Johnston and Reens

(57) ABSTRACT

A tool table with top as a first rotating element that rotates relative to the top about its center. Within the rotating element is a secondary rotating element that rotates relative to the rotating element. A variety of tools affix or are used in used in connection with the second rotating element such that the tool can be installed above top of the table and then flipped to rotate such that the motor is below the top of the table but the blade or cutting element is above the top of the table. The tool can also slide within the secondary rotating element.

20 Claims, 12 Drawing Sheets

(56) References Cited

U.S. PATENT DOCUMENTS

2012/0266783 A1* 10/2012 Yoshida ............... B23Q 1/4857
108/2
2015/0292852 A1* 10/2015 Oki ........................ G01B 5/008
33/502

* cited by examiner

MULTI FUNCTION TOOL TABLE

FIELD OF THE INVENTION

The following invention generally relates to tools. More specifically, the invention provides a tool table that receives conventional wood working tools to provide multiple uses therefor.

BACKGROUND OF THE INVENTION

Woodworking shops normally are equipped with many tools such as tablesaws, routers, shapers, planers, bandsaws, scrollsaws, drills, sanders and many others. Many of the aforementioned tools are table based—meaning they are rather large and heavy and generally serve a single function.

In addition to table based tools, there are uses for hand tools such as jigsaws, circular saws, routers and other powered hand tools. Often, each tool has a very specific use and many cannot serve multiple purposes.

For example, circular saws, table saws and chop/miter saws all generally have the same blade (or style of blade), but each is for different functions. For example, circular saws are portable and often used for cross cuts (across the grain of the wood) where portability is important. Table saws are normally used for rip cuts (along the grain of the wood) as well as cross cuts. Miter/chop saws are normally used for angled cuts such as crown molding and others. However, in order to perform all of these cuts, it may be necessary to have three separate tools. Further, since the table saw in a woodworking shop is generally not portable, many will also purchase a contractors saw for off-site jobs. A contractors saw is more or less the same as a table saw, but packaged in a smaller size that can be moved to job sites more easily.

Although portable table saws may add some portability, in order to perform all of the desired cuts one may want to do at a job location with the generally circular blades, it may still be necessary to bring three tools—the portable table saw, the circular saw (hand held) and the miter/chop saw.

The result is a large number of tools that each come with their own expense and the requirement to bring these tools to the job site.

Similarly, other portable tools such as routers and router tables generally have similar bits, but the router is hand held and the router table has rotating bit coming out of the table surface and various fences. Shapers are similar in function, but like the table saw, are much larger table based tools not designed to be portable. One solution to provide for both hand held and table based use of router bits is to purchase a hand held router and a specific table to receive said router. But, the table provides yet another piece of equipment on top of the aforementioned tools and this table generally only has one use.

Therefore, it is desirable to reduce the number of tools used while increasing the overall functionality of this reduced number of tools.

SUMMARY OF THE INVENTION

It is therefore an object of the present invention to provide a tool table that provides improved versatility and reduced requirements for tools/pieces to complete a woodworking or mobile tool kit.

It is another object to provide a tool table that can receive multiple different tools such that these tools can be used in their hand-held versions separate from the table and that these tools can then be affixed or used with the table to provide table based functionality and versatility.

These and other objects are achieved by providing a tool table with top having a first rotating element that rotates relative to the top. Within the rotating element is a secondary rotating element that rotates relative to the rotating element. A variety of tools affix or are used in used in connection with the second rotating element such that the tool can be installed above top of the table and then flipped to rotate such that the motor is below the top of the table but the blade or cutting element is above the top of the table.

In one aspect a tool table is configured to receive at least one tool, the table includes a first top. A first element has a circular shape and rotates relative to the first top about a first axis passing through a center of the first element. A second element is connected to the first element such that the second element rotates about a second axis orthogonal to the first axis. The second element is configured to receive the at least one tool. A stop is configured to limit rotation of the second element about the second axis. The stop, when engaged, limits rotation of the second element in at least first and second positions. The first position such that the second element has a surface in a plane parallel to the first top and the first and second positions are 180 degrees relative to each other.

In one aspect the second element includes a channel allowing the at least one tool to slide within the channel parallel to the second axis. In one aspect a blade of the tool aligns with a third axis passing through the center. In one aspect, the third axis rotates with the first element.

In another aspect the second axis is offset relative to a third axis, the third axis passing through the center and parallel to the second axis.

In one aspect the second element is configured to secure to the tool to fix the tool in a position relative to the center.

In one aspect at least one opening positioned in a base below the first top, the at least one opening configured to receive a work piece therein to hold the work piece orthogonal to the first axis.

In one aspect at least one opening is positioned in the base below the first top and a stop limits motion of the tool within the channel. A second base is positioned below the first top and configured to support a work piece inserted into the opening, the second base including at least one groove therein such that a blade of the at least one tool is held away from the second base when the at least one tool is positioned in the channel and the stop prevents the blade from contacting the second base.

In some aspects, the opening is defined by a hinged door.

In one aspect, the tool is selected from a circular saw, a router or a jigsaw.

In one aspect, the second element is configured to secure to the tool.

In some aspects, second top has a void therein and is configured to fit over the first top such that a blade of the tool fits within the void without contacting the second top.

In other aspect the first position places a blade of the tool below the first top and the second position places the blade above the first top.

In one aspect, the first element includes a hole therein adjacent to the second element, the hole allowing the at least one tool to rotate freely while secured to said second element between the first and second positions.

In one aspect an adaptor is configured to secure both to the second element and the tool to thereby secure the tool to the second element via the adaptor.

In another aspect, the first top has a circular recess and the first element is positioned in the circular recess such that a surface of the first top and a surface of the second element align.

In yet another aspect at least one mount secures the second element to the first element and the mount is adjustable such that the second axis can be moved relative to the center.

In other aspects, a method is provided for assembling a tool table including steps of: providing a table having a first top, a first element and a second element, the first element being of circular shape and rotatable relative to the first top about a first axis, the second element connected to the first element and rotatable about a second axis orthogonal to the first axis; providing a tool; securing the tool to the second element; and rotating the tool and second element from a first position towards a second position until a stop limits rotation of the second element relative to the first element, wherein in the second position, the tool is configured such that a blade installed in the tool is at least partly above the first top.

Other objects of the invention and its particular features and advantages will become more apparent from consideration of the following drawings and accompanying detailed description.

DETAILED DESCRIPTION OF THE INVENTION

Figure 1:
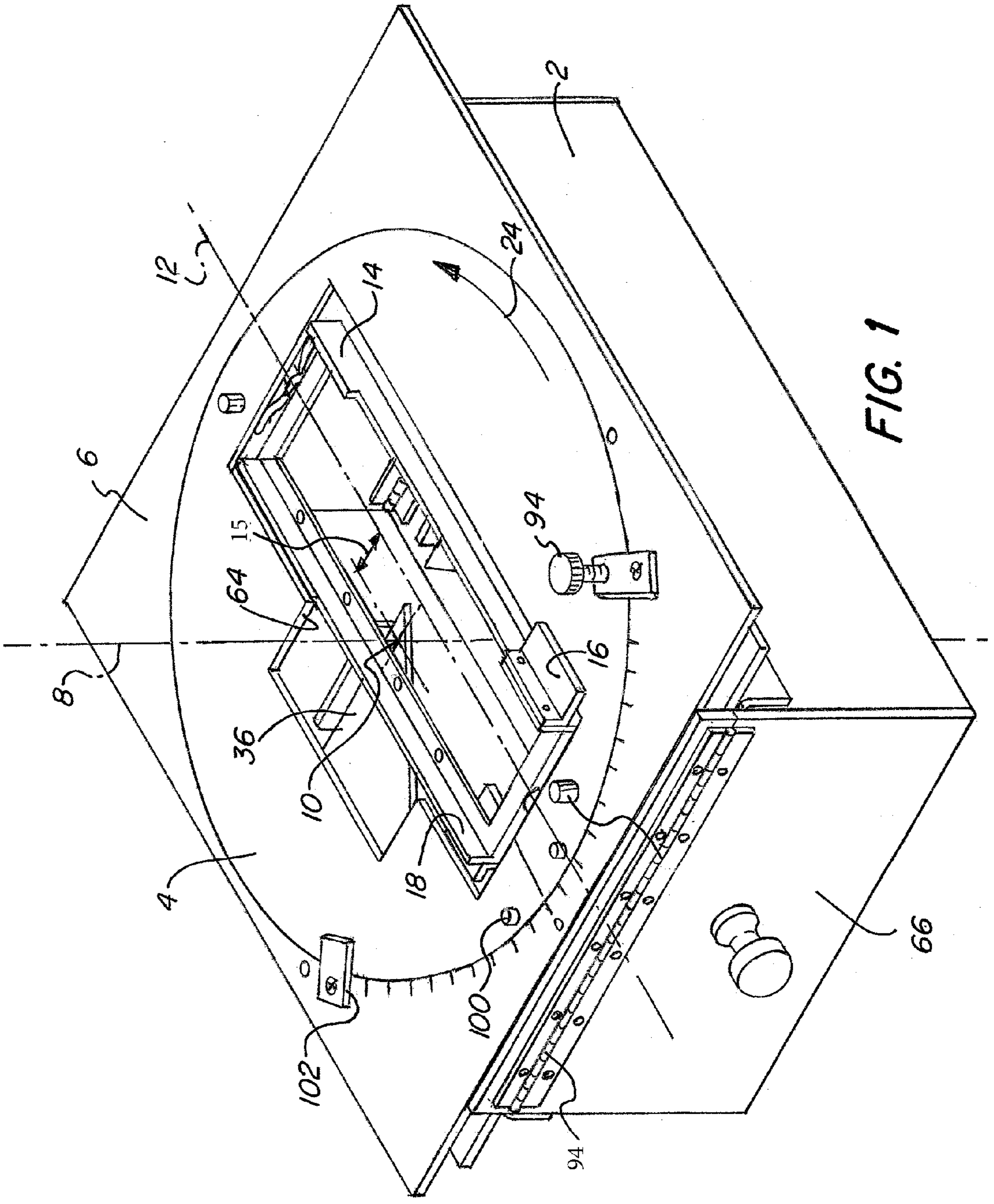
FIG. 1 is perspective view of the multi-function tool table without a tool installed thereon.

Referring now to the drawings, wherein like reference numerals designate corresponding structure throughout the views. The following examples are presented to further illustrate and explain the present invention and should not be taken as limiting in any regard.

Figure 15:
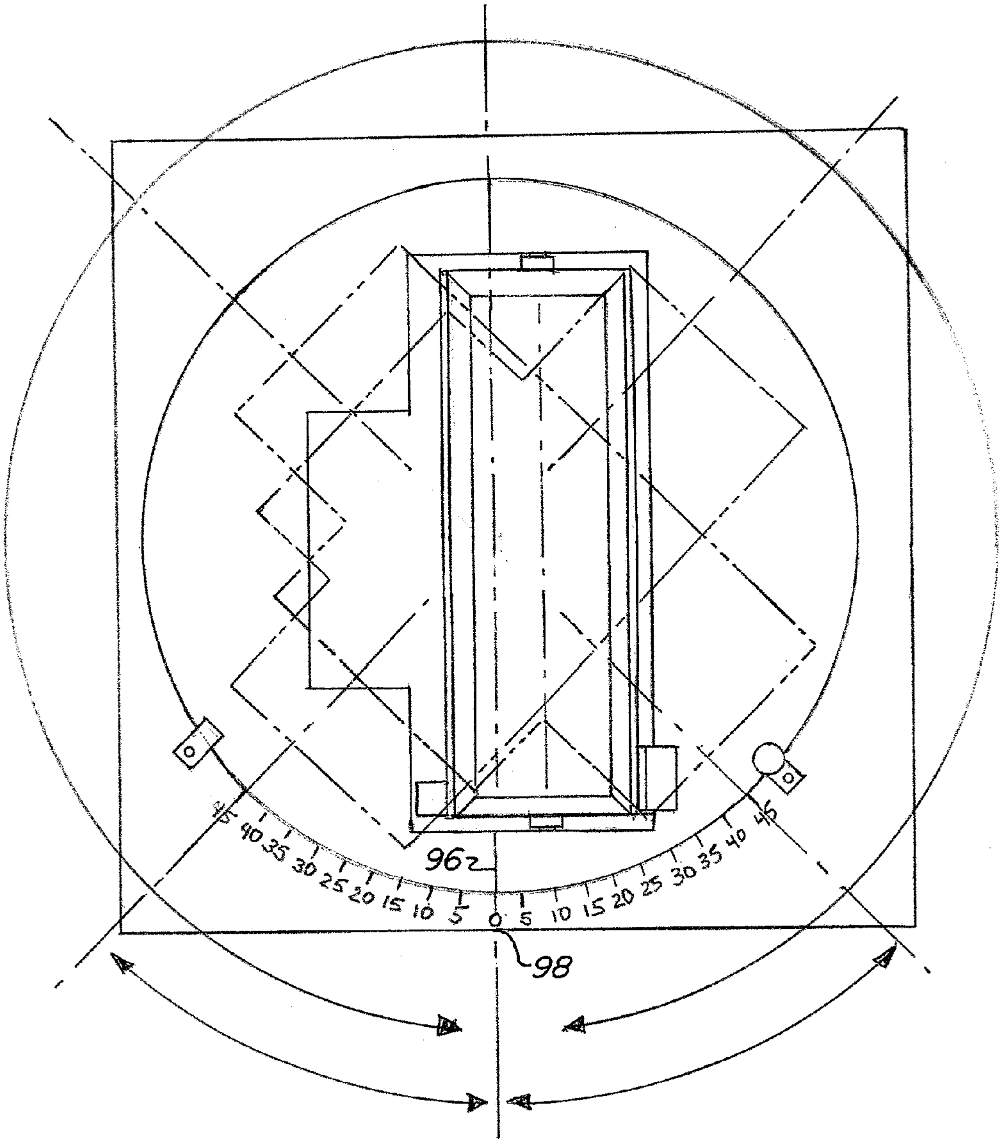
FIG. 15 is a top view of FIG. 1 showing how the disc moves.
Figure 16:
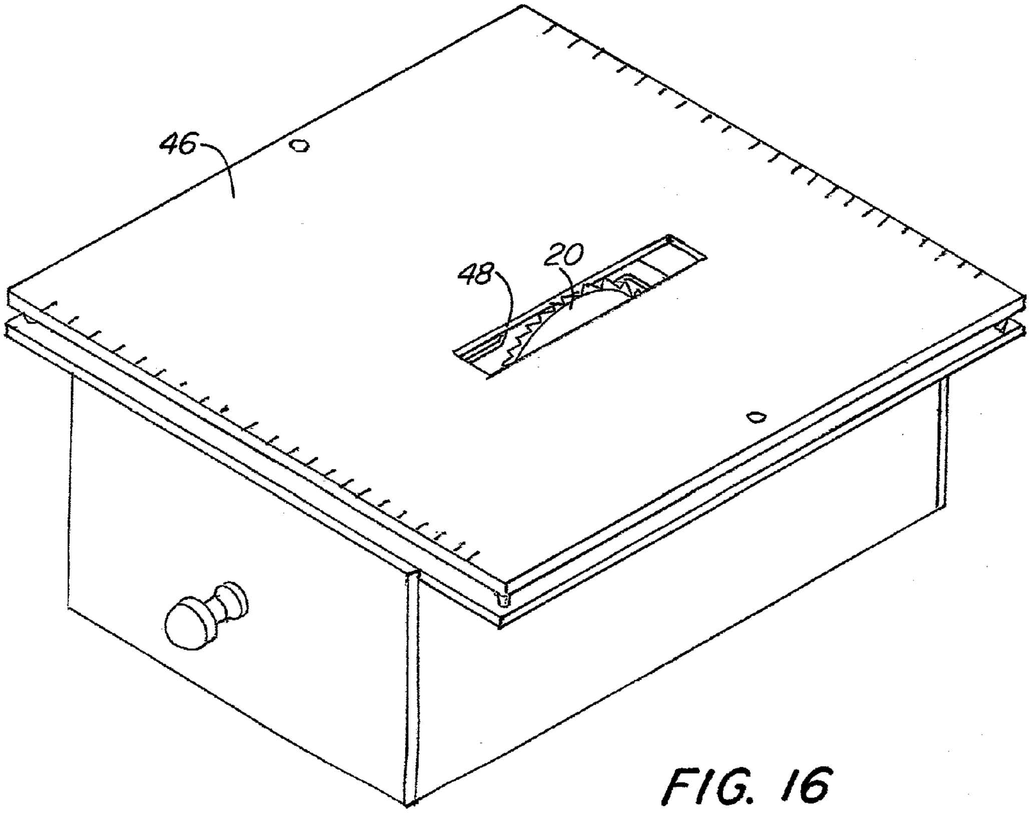
FIG. 16 is a perspective view of FIG. 1 with the tool table configured as a table saw.
Figure 17:
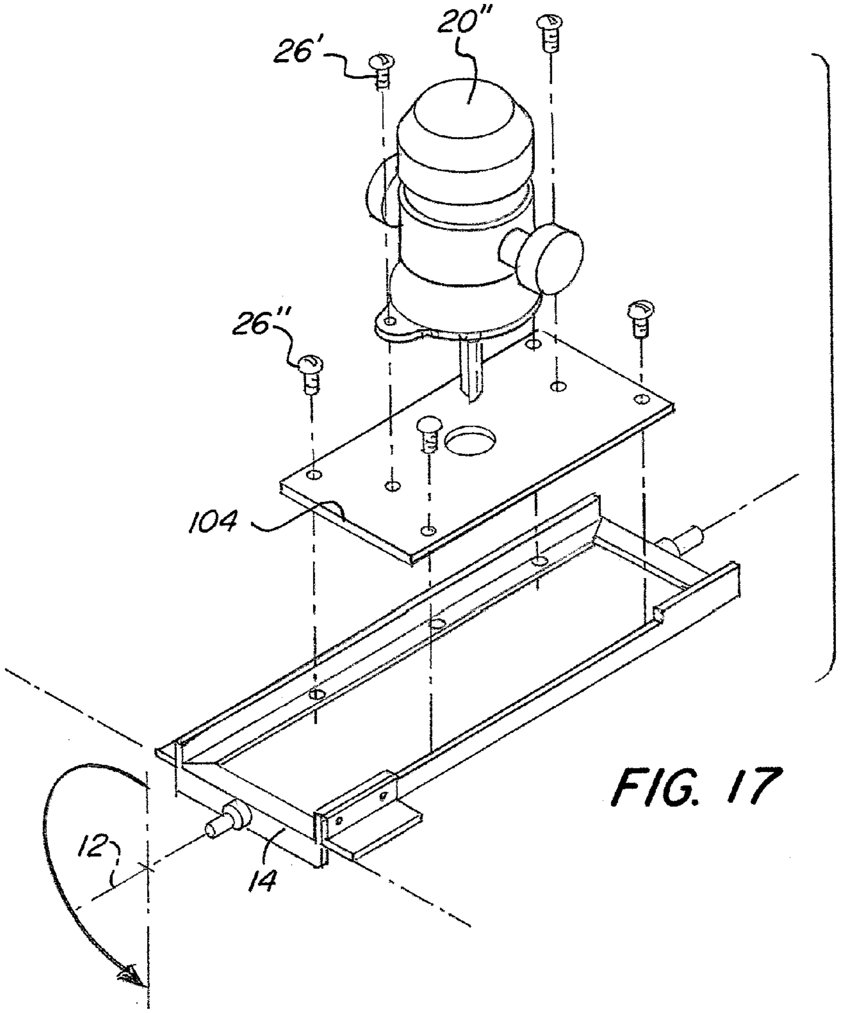
FIG. 17 is a detail exploded perspective view of FIG. 1 with a router installed thereon.

The tool table shown includes a base 2 and a first top 6 with a circular element 4 which rotates within the first top 6 about axis 8. A second element 14 is secured to the circular element 4 and rotates 24 about axis 12. As can be seen, axis 12 is offset relative to center 10 of the circular element 4. The offset distance is represented by numeral 15. Normally, circular saws are offset relative to their base, thus when a circular saw is positioned in channel 18 and the second element 14 is positioned as shown (saw motor up/blade down), the blade of the circular saw aligns with center such that reference signs 98/96 (FIG. 15), relate to the position of the blade. Knob 94 is used to hold the disc at a desired angle relative to axis 8 and catch 102 prevents the disc 4 from coming out of recess 50. Additional catches 102 may be used for added security. Stop 100 may interact with catch 102 to prevent over-rotation of the disc 4. For example, if the disc 4 were rotated too far, the saw blade 20 may cut through the second base 36 when the table is operated by the user. FIG. 15 shows +/−45 degree positions of the disc 4. Intermediate angles can also be used depending on what cut the user is making.

Figure 2:
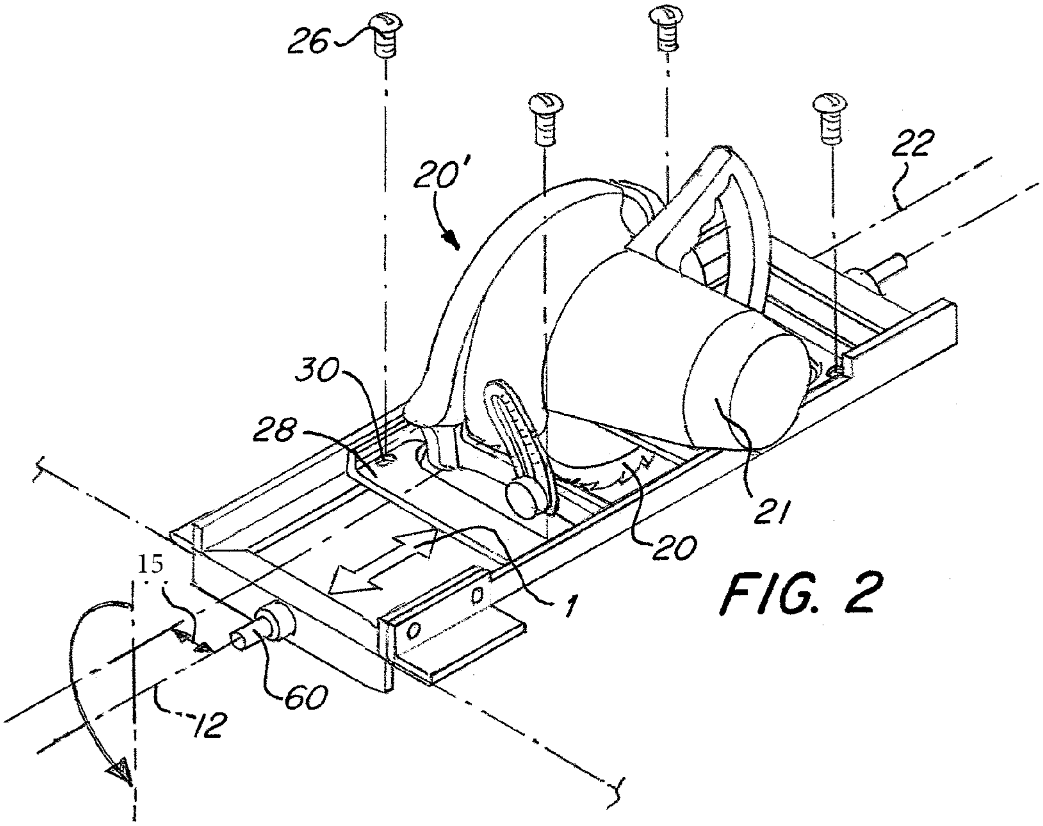
FIG. 2 is a detail view of FIG. 1 showing a tool installed thereon.

The disc 4 rotates within a recess 50 and the second element 14 may be secured to the disc 4 by a bolt passing through stop 16 or other clamp. With the recess 50, surfaces 52 and 54 align. The stop 16 ensures that the second element 14 is level with respect to the disc 4. In the first position of the second element 14 which is generally shown in FIGS. 1 and 2, the motor of the saw is above and the blade is positioned in the opening below the top. The saw can slide back and forth 1 within channel 18 and when the disc 4 is rotated, cuts can be made at various angles. To the extent a compound angle needs to be cut, the disc 4 is rotated to the desired angle and then the saw blade is angled relative to its base 28 using existing tilt functionality of the circular saw.

Within the base 2 there are two openings 32 in opposite sides. Hinged doors 40 may define the openings. A second base 36 has a cutout 38 therein which as shown is generally shaped like an arrow. The cutout 38 enables the saw blade 20 to move freely below the first top 6, while the rest of the second base 36 provides support for a workpiece. For example, a piece of crown molding may be inserted into the opening and positioned in the path of the saw blade 20 along axis 22. The disc 4 is positioned and then the saw is turned on and moved 1 to cut the workpiece. In this manner, a replacement for a miter saw is provided. In some ways, this configuration works similar to a radial arm saw which is normally a fixed tool, i.e. not portable.

The pin 60 is secured to the bottom surface of the disc 4 via screws 56 and bar 58. The pin 60 enables the second element to rotate. The holes 62 may be oblong to enable adjustment of the position of axis 12 relative to center 10 of the disc 4.

Figure 3:
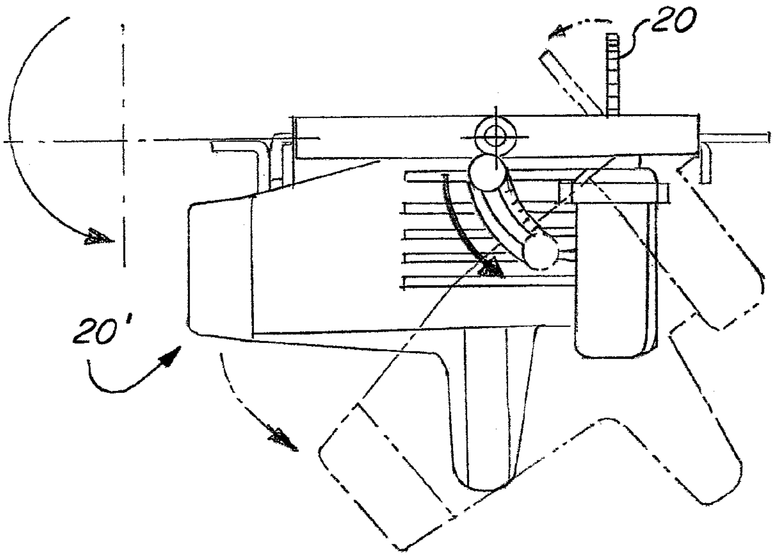
FIG. 3 is a front detail view of FIG. 1.
Figure 4:
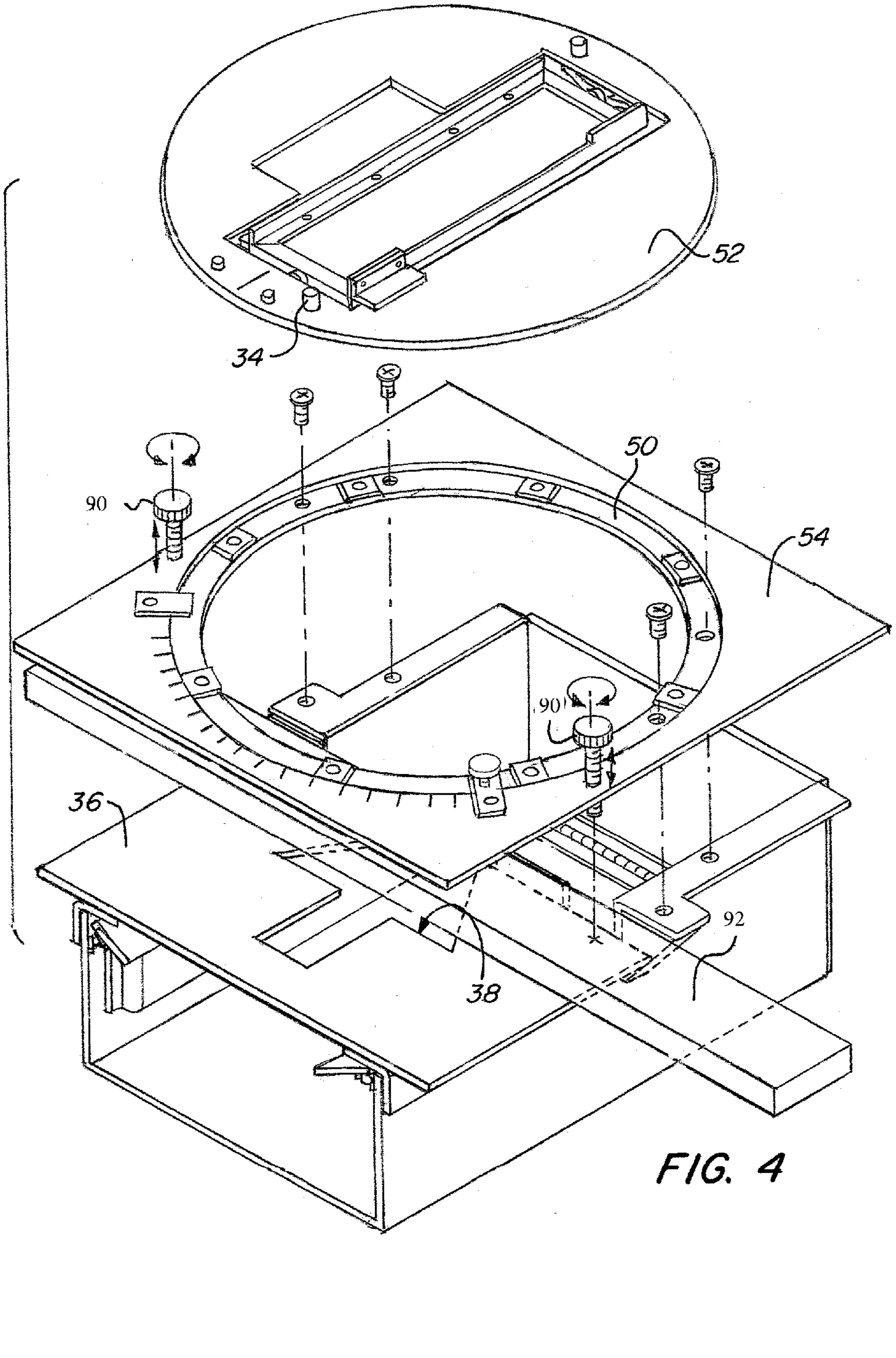
FIG. 4 is an exploded perspective view of FIG. 1.
Figure 5:
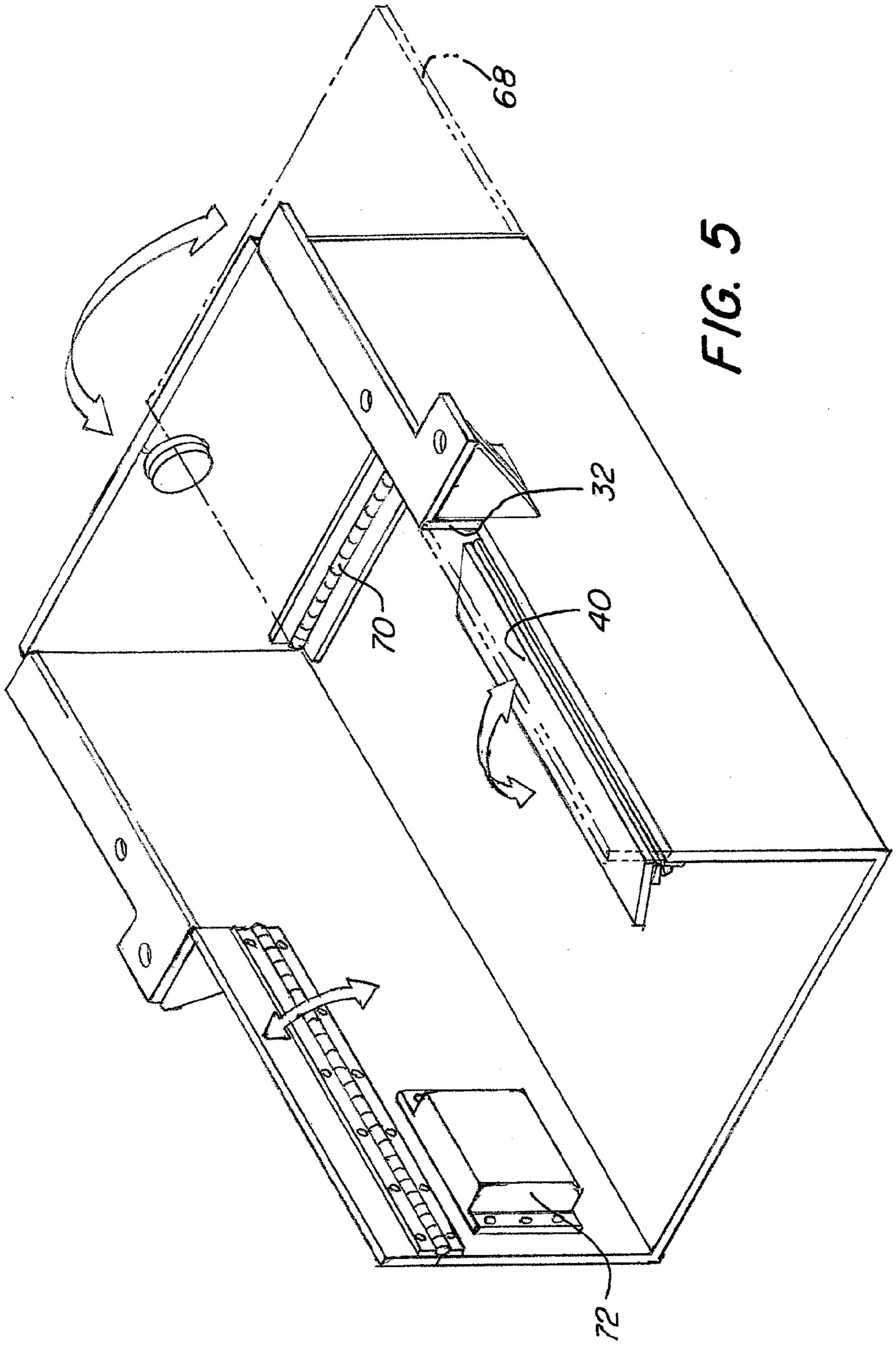
FIG. 5 is a detail perspective view of the drawer in FIG. 1.
Figure 6:
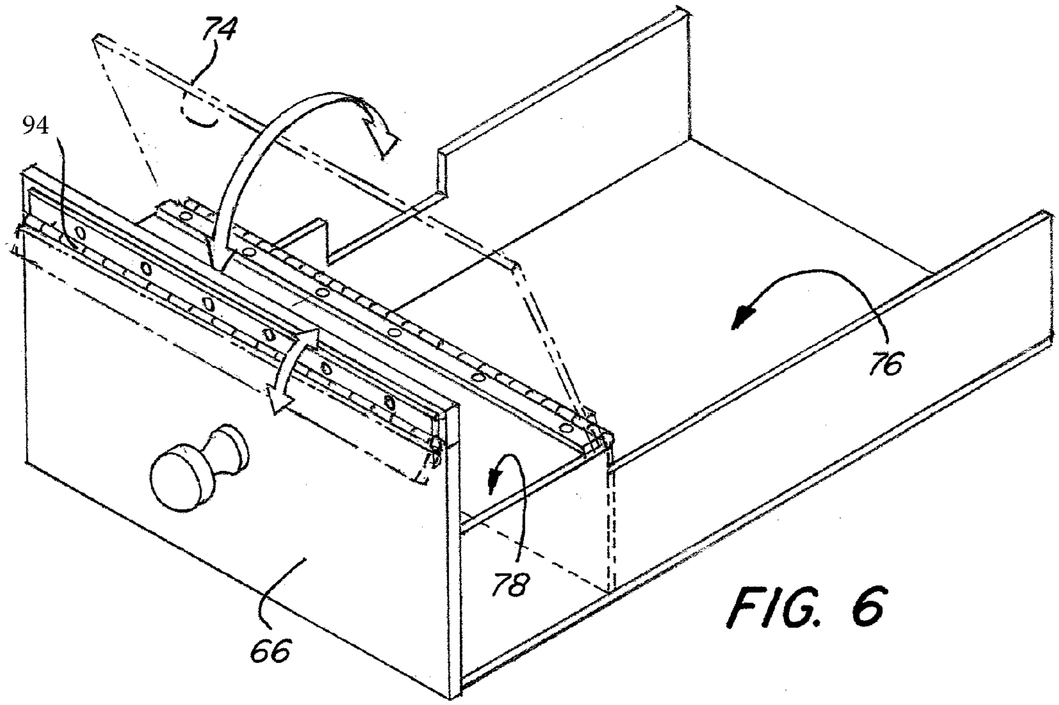
FIG. 6 is another detail perspective view of the drawer in FIG. 1.
Figure 7:
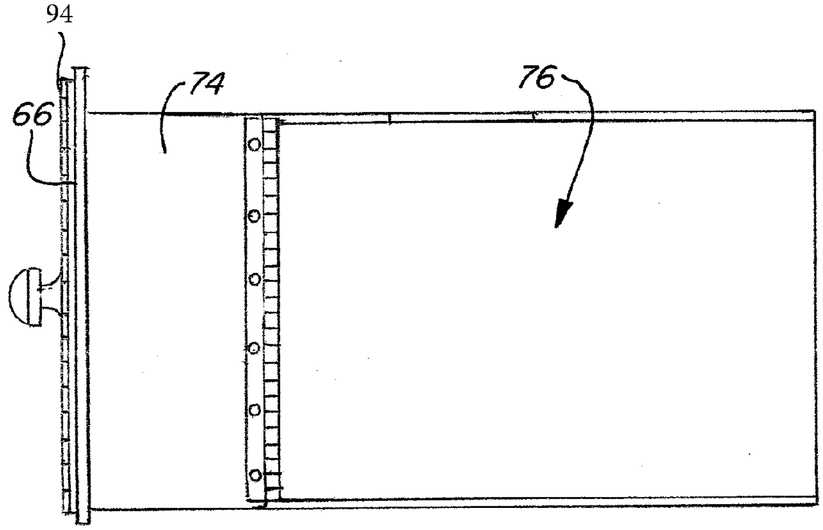
FIG. 7 is a top view of the drawer in FIG. 1.
Figure 8:
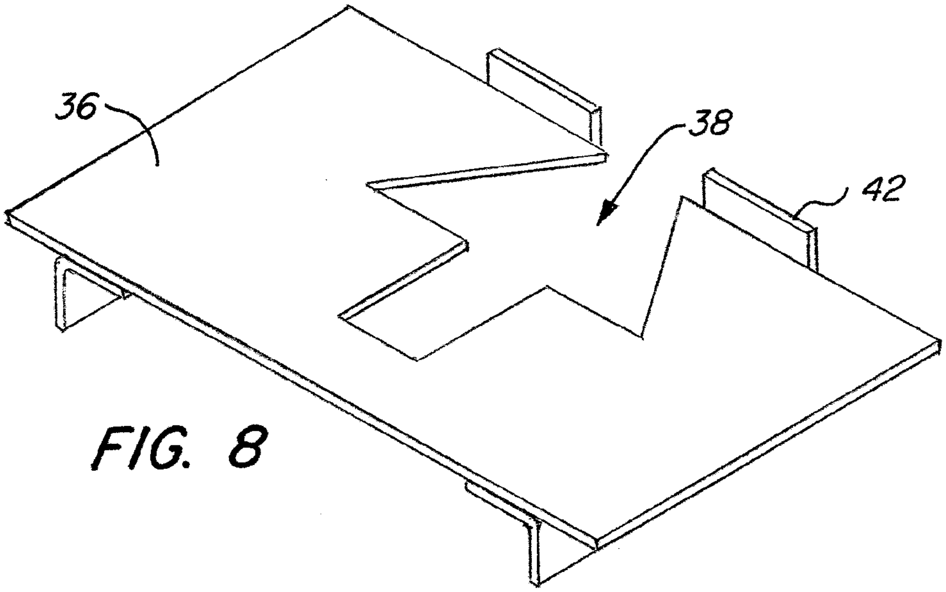
FIG. 8 is a perspective view of part of the tool table of FIG. 1.
Figure 9:
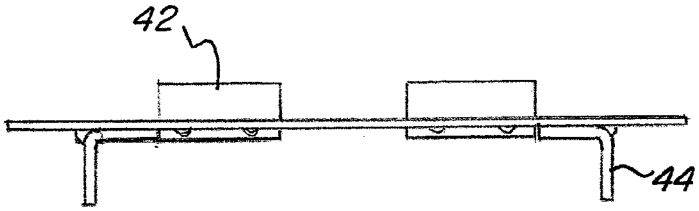
FIG. 9 is a front view of part of the tool table of FIG. 1.
Figure 10:
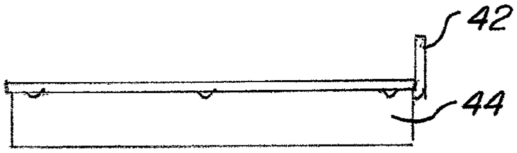
FIG. 10 is a side view of part of the tool table of FIG. 1.
Figure 11:
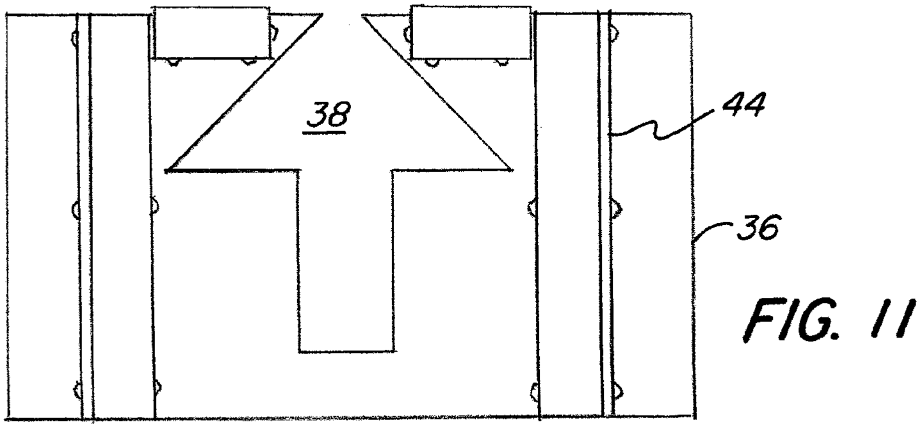
FIG. 11 is a top view of part of the tool table of FIG. 1.
Figure 12:
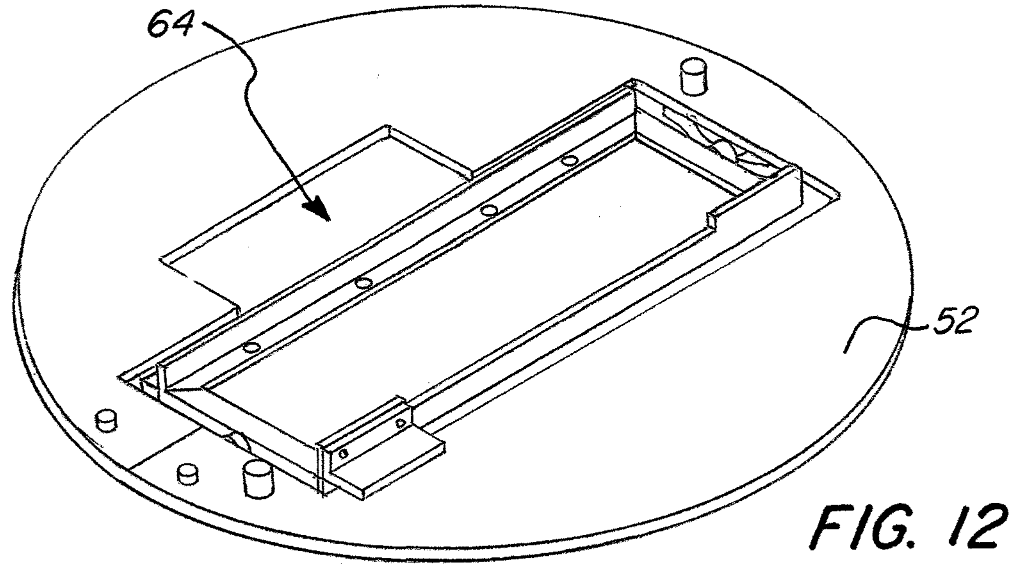
FIG. 12 is an assembled view of the rotating disc of FIG. 1.
Figure 13:
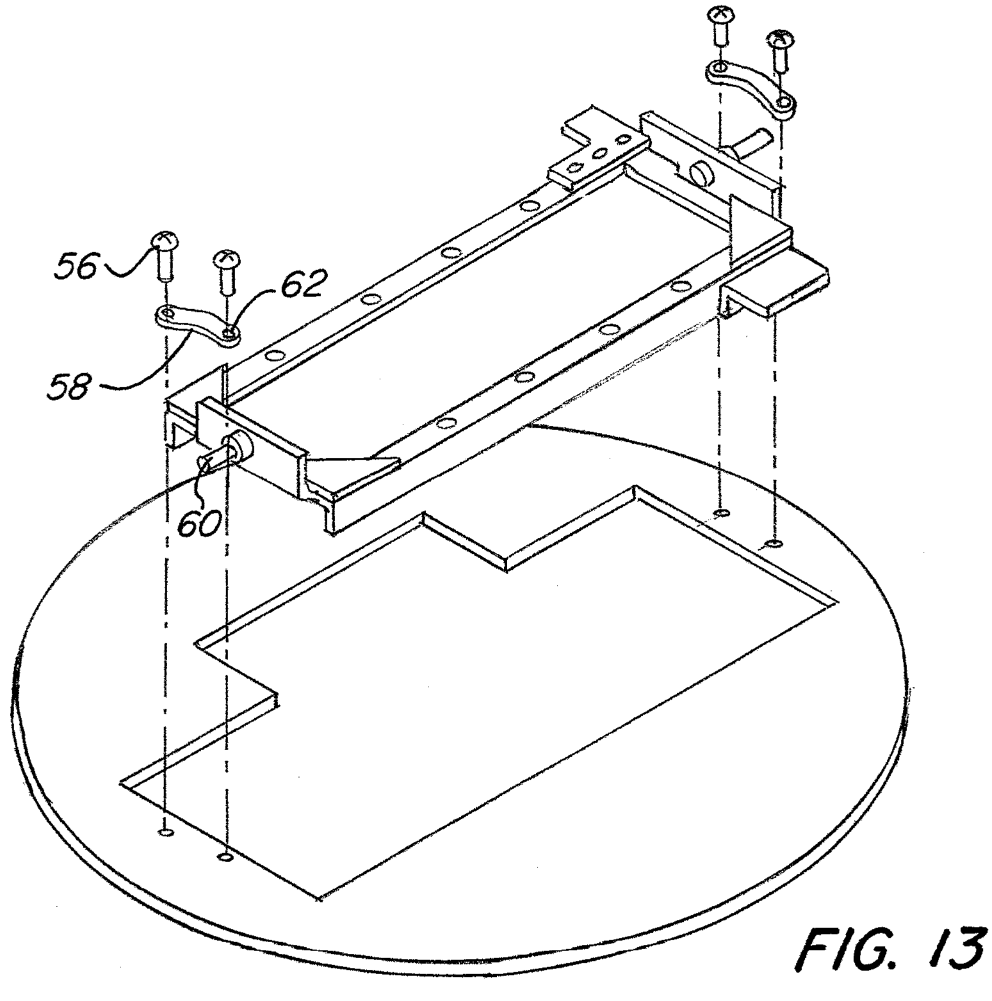
FIG. 13 an exploded bottom view of the rotating disc of FIG. 1.

When the base 28 of the circular saw is secured via screws 26 to the second element 14, the tool can rotate to the lower position shown in FIG. 3. Here, stop 16' is engaged with the disc 4 to position the base of the tool 28 parallel to the disc 4. It is understood that stop 16 and stop 16' may be a single piece, or different parts of the single piece. Alternately, separate pieces could be used. From this lower position, blade 20 can be tilted as shown in the dashed lines using the existing tilt function on most circular saws. With this configuration, a table saw is created and the second top 46 is placed over the first top. Pins in the corners of the second top may insert into holes in the first top and opening 48 allows the blade 20 to spin freely.

The second top may also be provided with an adjustable fence 84 which can tighten with knob 86 such that when knob 86 is tightened, catch 88 on the opposite end of the fence 84 is pulled and thereby stopped by the second top 46 so that the fence 84 does not move. Dust collector 90 and support 80 with adjustors 82 enable both dust collection and security by covering the blade. Adjustment of the height of the blade 20 relative to second top 46 is accomplished using existing adjustment features provided on the circular saw.

The base 2 also includes a drawer 66 which acts as a dust collector and storage for additional tools and accessories. The drawer can slide in and out of base 2 and also includes the hinged doors 40 to create the opening. When the table is configured as a circular saw, router table or scroll saw (motor below), these doors may be shut so that sawdust is better collected in the drawer. Rear door 68 is hingedly connected 70 with the drawer 66 to enable cleaning of the drawer.

Drawer 66 also includes a front partition 78 with a separate door 74 which may be used to store accessories for the tool table. For example, adaptor 104 and various tools and screws for operating the tool table. Further, drawer 66 supports the second base 36 which may have a front fence 42 to hold the workpiece when the saw motor is positioned above the table. Side part 44 ensures that the second base 36 is centered relative to the drawer 66/base 2. As described previously, the arrow shaped cutout 38 provides space for the blade 20 to move without damaging the second base 36. In addition, stop 34 positioned on the disc 4 limits movement of the saw base 28 along axis 12. In this way, the saw cannot be moved in the channel 18 to cut through the second element 14 or the second base 36 or otherwise damage the table supports the second base.

When the workpiece 92 is positioned on top of the second base 36 and in the opening 32, the tool can be moved within the second element 14 to act as a miter saw. In this situation, clamping elements 90 may be useful for holding the workpiece 92. Although clamping elements 90 are shown as screws, it is understood that other devices could be used to hold the workpiece 92 such as spring loaded clamps, friction based devices or others. In one configuration, drawer 66 has a hinged 94 section that enables part of the drawer 66 face to be opened to receive the workpiece 92. In this situation, the hinge 94 is located such that when open, the door on the drawer 66 face reveals an opening that is level or below the second base 36.

Figure 18:
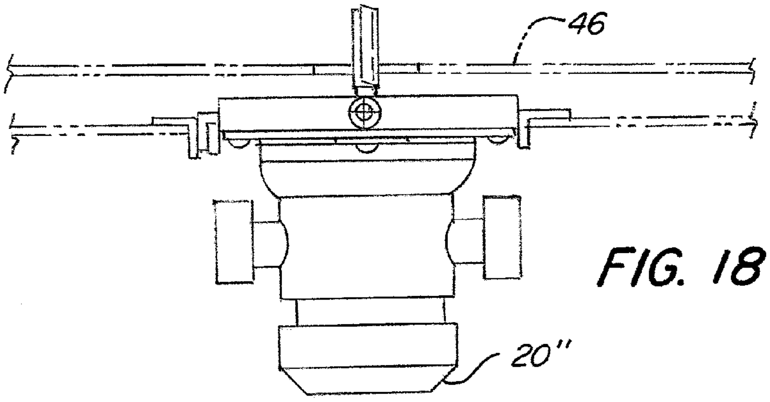
FIG. 18 is a side detail view of a router installed on the tool table of FIG. 1
Figure 19:
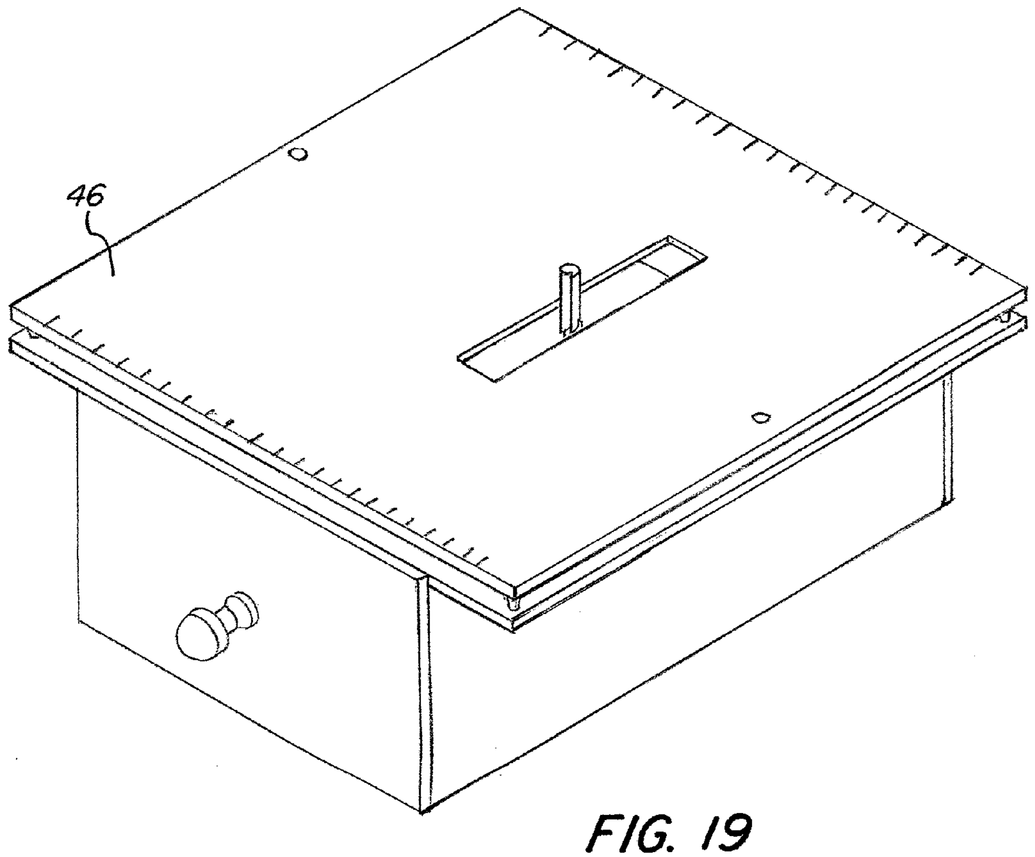
FIG. 19 is a perspective view of the tool table of FIG. 1 configured as a router table.

In addition to the circular saw configuration shown, other tools such as routers, jigsaws etc. may be used in the tool table. In this case, the base of the other tools may be narrower than the channel 18 provided by the second base. In order to enable use of these other tools, an adaptor 104 is provided. This adaptor can secure to existing holes in the base via screws 26'. In other cases, the adaptor can have jaws or other securing methodologies used to hold the base to the adaptor. The adaptor is then secured to the second element 14. For example, screws 26" may be used to accomplish this. Then, the router 20" is rotated below as shown in FIG. 18 and the second top 46 is added to create router table. If a jigsaw is added instead of a router, the tool table would be configured similar to a scroll saw.

Figure 14:
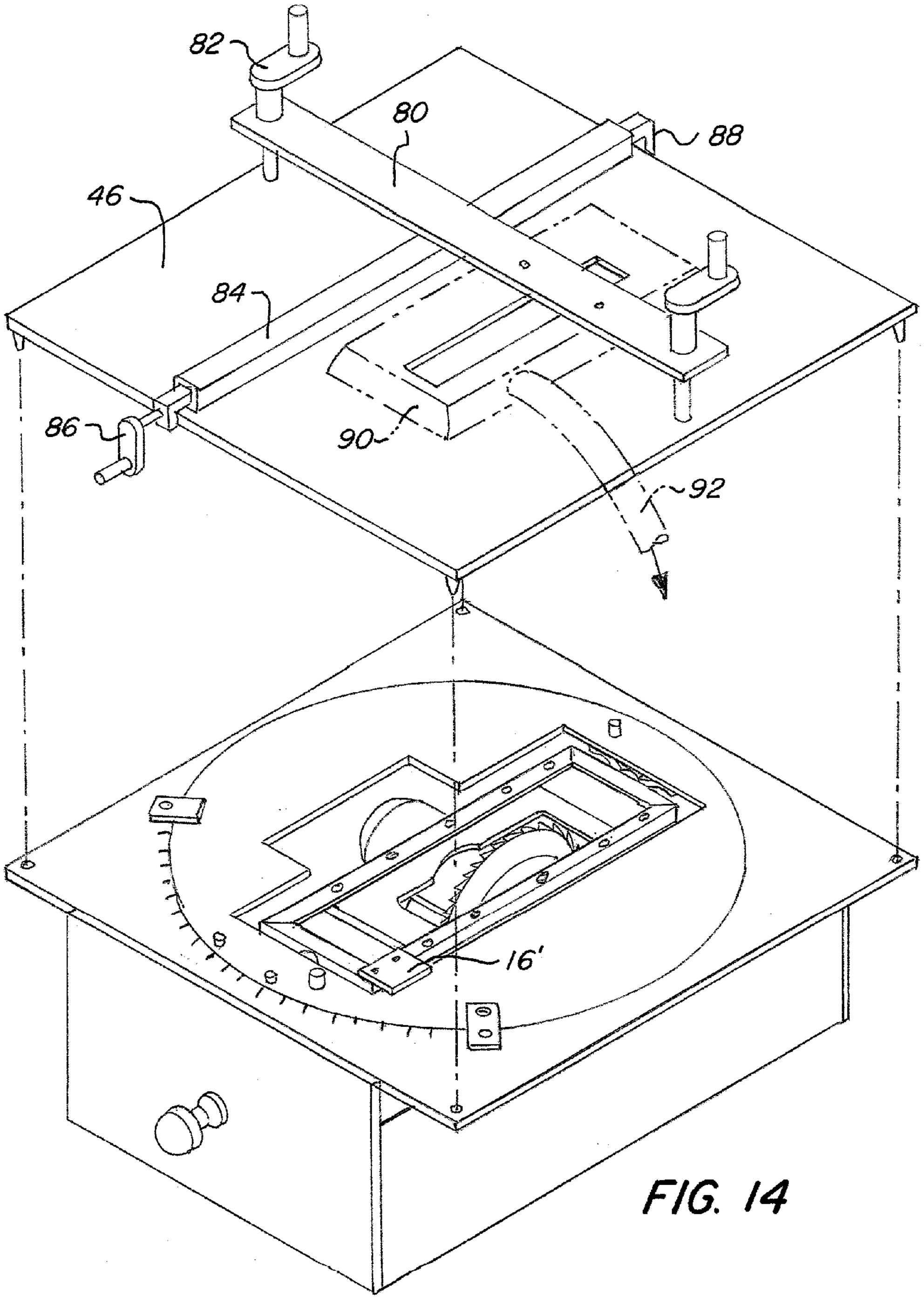
FIG. 14 is a perspective view of FIG. 1 with the tool table configured as a table saw.

Opening 64 in disc 4 enables tools secured to the second element 14 to rotate freely between the first position (FIG. 1) and the second position (FIG. 14). Thus, the tool can be secured to the table above the top and then rotated below. It is often much easier to secure something by working from the top, thus the rotation about axis 12 provides ease of user operation of the table.

In order to create the table version of the tool, the tool table is provided with the rotating disc and second element. The tool is secured to the second element from above the table and then the tool is rotated such that its motor is positioned below the tool, preferably within the drawer. The second element is then secured in position and the second top is laid over the assembly. In some aspects, the power cord of the tool is connected to switch box 72 which includes an external switch (not shown). In this way, the tool can be turned on from outside the table.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A tool table configured to receive at least one tool, the table comprising:
- a first element having a circular shape;
- a first top wherein said first element rotates relative to said first top about a first axis passing through a center of said first element;
- a second element connected to said first element such that said second element rotates about a second axis orthogonal to said first axis;
- said second element configured to receive the at least one tool;
- at least one stop configured to limit rotation of said second element about said second axis wherein at least one of said at least one stop when engaged limits rotation of said second element in at least first and second positions, wherein the first and second positions are such that said second element has a surface in a plane parallel to said first top and said first and second positions are 180 degrees relative to each other.

2. The tool table of claim 1 wherein said second element includes a channel allowing the at least one tool to slide within the channel parallel to said second axis.

3. The tool table of claim 2 wherein a blade of the tool aligns with a third axis passing through the center.

4. The tool table of claim 3 wherein the third axis rotates with the first element.

5. The tool table of claim 1 wherein said second axis is offset relative to a third axis, the third axis passing through the center and parallel to said second axis.

6. The tool table of claim 1 wherein said second element is configured to secure to the tool to fix the tool in a position relative to the center.

7. The tool table of claim 1 further comprising at least one opening positioned in a base below said first top, the at least one opening configured to receive a work piece therein to hold the work piece orthogonal to the first axis.

8. The tool table of claim 2 further comprising:
- at least one opening positioned in a base below said first top;
- a second stop limiting motion of said tool within said channel;

a second base positioned below said first top and configured to support a work piece inserted into said opening, said second base including at least one groove therein such that a blade of the at least one tool is held away from said second base when the at least one tool is positioned in the channel and said second stop prevents the blade from contacting said second base.

9. The tool table of claim 7 wherein at least one said opening is defined by a hinged door.

10. The tool table of claim 8 wherein at least one said opening is defined by a hinged door.

11. The tool table of claim 1 wherein the at least one tool is selected from the group consisting of a circular saw, a router and a jigsaw.

12. The tool table of claim 1 wherein said second element is configured to secure to the at least one tool.

13. The tool table of claim 1 further comprising a second top having a void therein, said second top configured to fit over said first top such that a blade of the at least one tool fits within said void without contacting said second top when a motor of said tool is positioned below said first top.

14. The tool table of claim 1 wherein said first position places a blade of the at least one tool below the first top and said second position places the blade above the first top.

15. The tool table of claim 1 wherein said first element includes a hole therein adjacent to said second element, said hole allowing the at least one tool to rotate freely while secured to said second element between the first and second positions.

16. The tool table of claim 1 further comprising an adaptor configured to secure both to said second element and the at least one tool between said second element and the at least one tool.

17. The tool table of claim 1 wherein said first top has a circular recess and said first element is positioned in said circular recess such that a surface of said first top and a surface of said second element align.

18. The tool table of claim 1 further comprising at least one mount securing the second element to the first element, wherein the mount is adjustable such that the second axis can be moved relative to the center.

19. The tool table of claim 1 wherein said first position places a blade of the at least one tool below the first top and said second position places the blade above the first top, said second element includes a channel allowing the at least one tool to slide within the channel parallel to said second axis, the blade of the at least one tool aligns with a third axis passing through the center, the third axis rotates with the first element, said second axis is offset relative to a third axis, the third axis passing through the center and parallel to said second axis and second element is configured to secure to the at least one tool to fix the tool in a position relative to the center, and further comprising:

at least one opening positioned in a base below said first top, the at least one opening configured to receive a work piece therein to hold the work piece orthogonal to the first axis, the at least one opening positioned in a base below said first top wherein at least one said opening is defined by a hinged door;

a second stop limiting motion of said tool within said channel;

a second base positioned below said first top and configured to support a work piece inserted into said opening, said second base including at least one groove therein such that a blade of the at least one tool is held away from said second base when the at least one tool is positioned in the channel and said second stop prevents the blade from contacting said second base;

a second top having a void therein, said second top configured to fit over said first top such that a blade of the at least one tool fits within said void without contacting said second top when a motor of said tool is positioned below said first top;

a hole in said first element adjacent to said second element, said hole allowing the at least one tool to rotate freely while secured to said second element between the first and second positions;

an adaptor configured to secure both to said second element and the at least one tool between said second element and the at least one tool;

a circular recess in said first top and said first element is positioned in said circular recess such that a surface of said first top and a surface of said second element align; and at least one mount securing the second element to the first element, wherein the mount is adjustable such that the second axis can be moved relative to the center.

20. A method of assembling a tool table comprising:

providing a table having a first top, a first element and a second element, the first element being of circular shape and rotatable relative to the first top about a first axis, the second element connected to the first element and rotatable about a second axis orthogonal to the first axis;

providing a tool;

securing the tool to said second element;

rotating the tool and second element from a first position towards a second position about the second axis until a stop limits rotation of the second element relative to the first element, wherein in the second position, the tool is configured such that a blade installed in the tool is at least partly above the first top.

* * * * *